July 12, 1949.                    R. A. WATSON                    2,475,654
                              CHAINLESS BICYCLE DRIVE
Filed May 16, 1945                                              3 Sheets-Sheet 1

INVENTOR.
ROY A. WATSON
BY
*Victor J. Evans & Co.*
ATTORNEYS

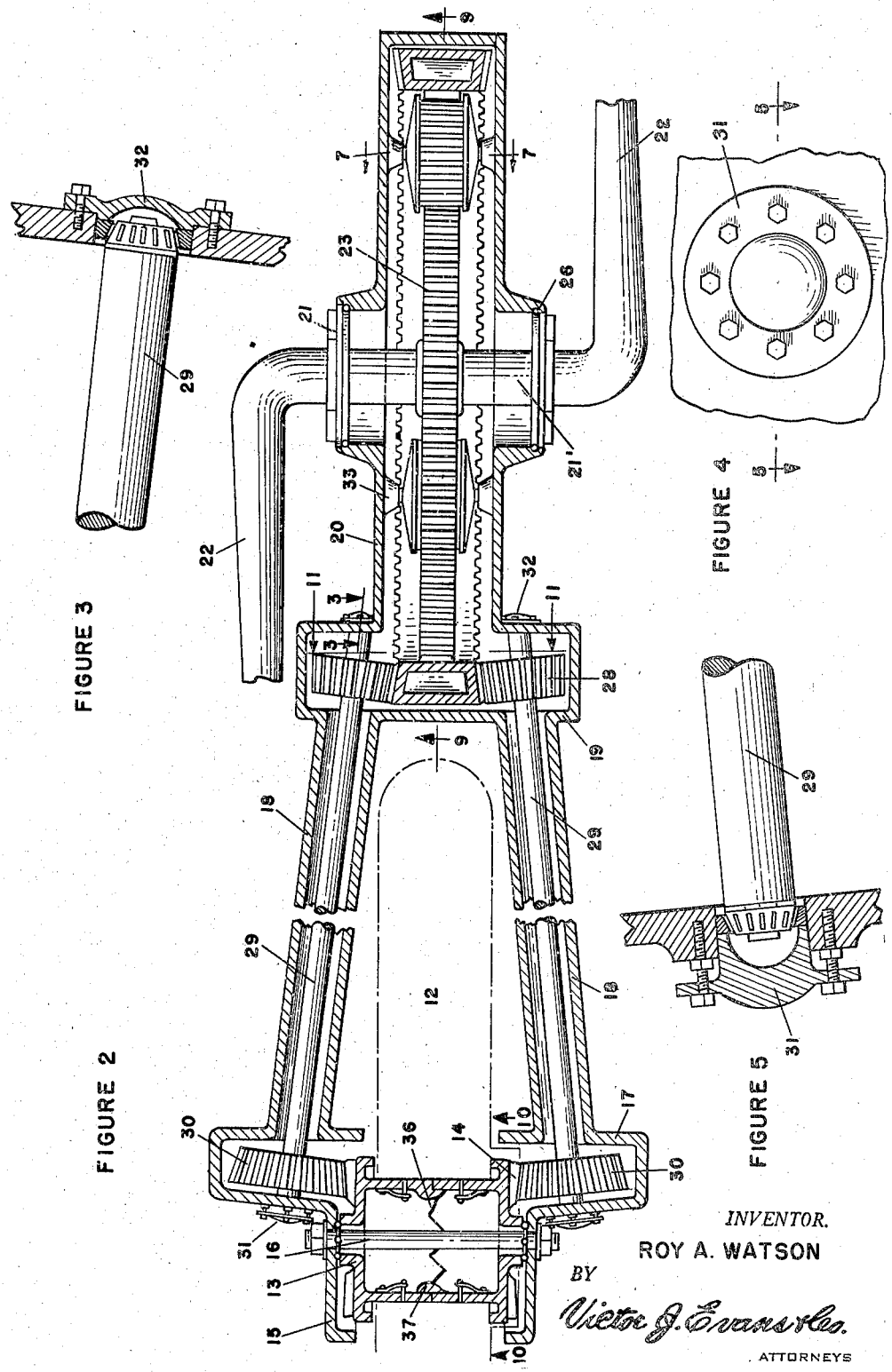

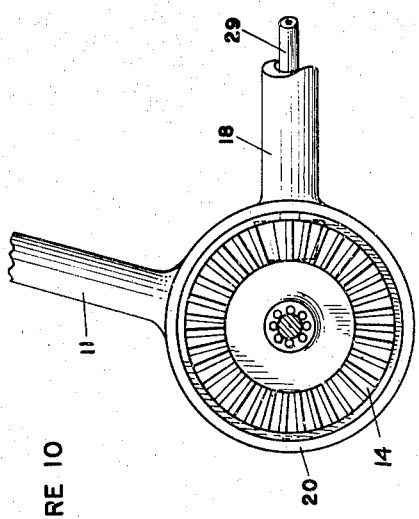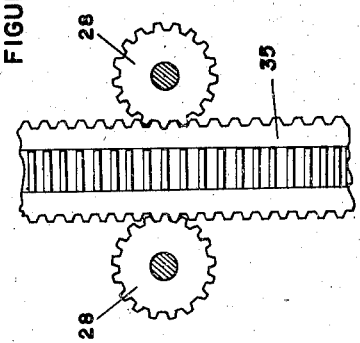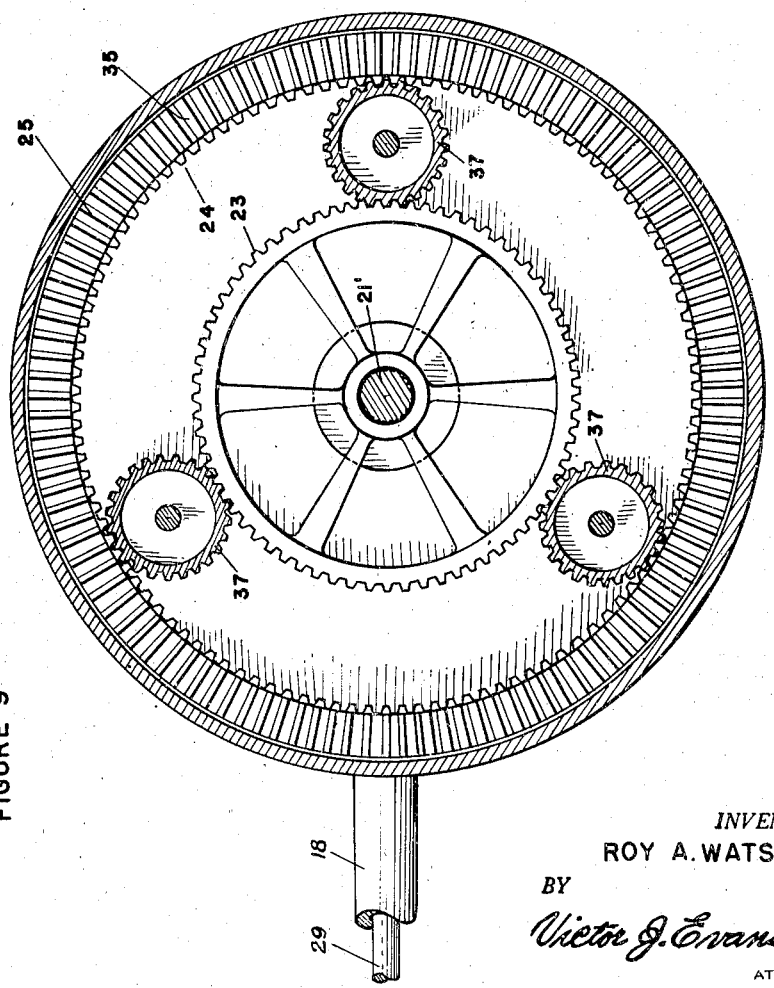

Patented July 12, 1949

2,475,654

UNITED STATES PATENT OFFICE 2,475,654

CHAINLESS BICYCLE DRIVE

Roy A. Watson, Canton, Ohio

Application May 16, 1945, Serial No. 594,113

1 Claim. (Cl. 280—260)

The invention relates to a bicycle, and more especially to a gear drive mechanism for bicycles.

The primary object of the invention is the provision of a mechanism of this character, wherein the power wheel of the bicycle is operated through gearing at both sides thereof, and such gearing is controlled by pedal action, thereby doing away with a chain drive, as common in the present day constructions of bicycles.

Another object of the invention is the provision of mechanism of this character, wherein the gearing and adjuncts thereof are entirely concealed, so as to avoid any entanglement therewith, and thus rendering the bicycle safe to a rider thereof, the gearing being of novel construction and arrangement.

A further object of the invention is the provision of mechanism of this character, wherein the parts thereof are readily accessible for inspection, repairs and replacements, the gearing being an arrangement, assuring maximum driving power with minimum manual labor on the part of an operator.

A still further object of the invention is the provision of mechanism of this character, which is simple in construction, thoroughly reliable and efficient in operation, strong, durable, easy of operation, neat and not detracting from the general appearance of the bicycle, smooth in the working thereof, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claim hereunto appended.

In the accompanying drawings:

Figure 2 is an enlarged sectional view taken on the line 2—2 of Figure 1 looking in the direction of the arrows.

Figure 3 is a sectional view taken on the line 3—3 of Figure 2 looking in the direction of the arrows.

Figure 4 is a fragmentary end view of the driving shaft housing.

Figure 5 is a sectional view taken on the line 5—5 of Figure 4 looking in the direction of the arrows.

Figure 9 is a sectional view taken on the line 9—9 of Figure 2 looking in the direction of the arrows.

Figure 10 is a sectional view taken on the line 10—10 of Figure 2 looking in the direction of the arrows.

Figure 11 is a sectional view taken on the line 11—11 of Figure 2 looking in the direction of the arrows.

Similar reference characters indicate corresponding parts throughout the several views in the drawings.

Figure 7:
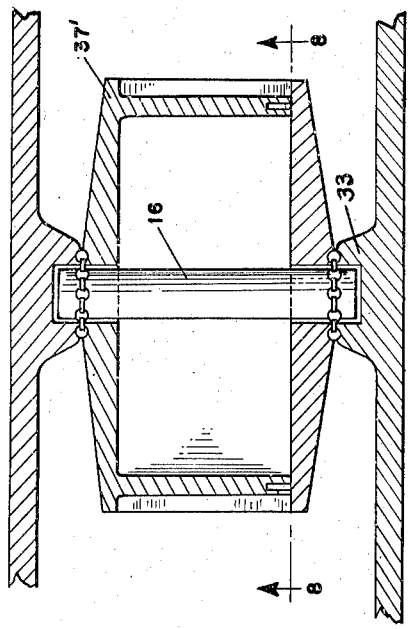
Figure 7 is a sectional view taken on the line 7—7 of Figure 2.
Figure 8:
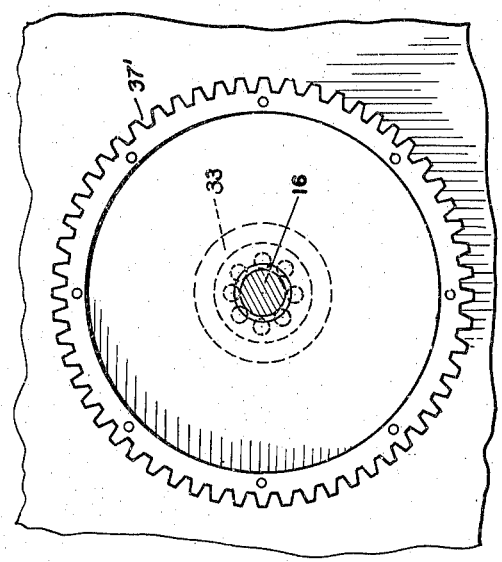
Figure 8 is a sectional view taken on the line 8—8 of Figure 7 looking in the direction of the arrows.
Figure 1:
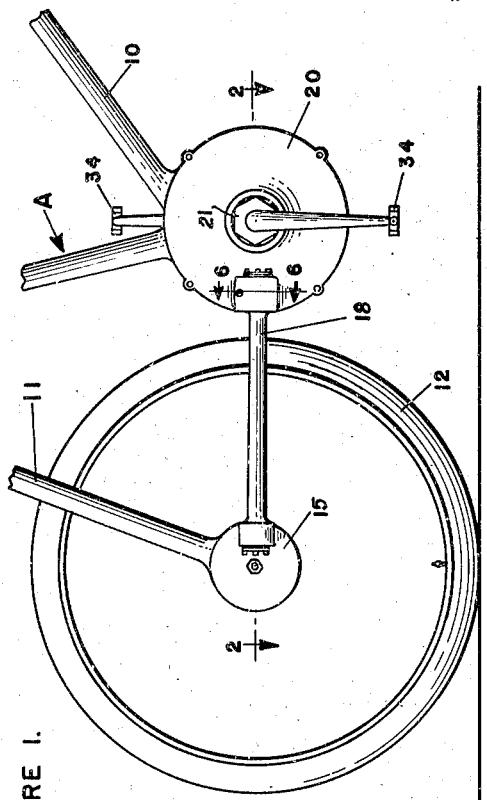
Figure 1 is a side view of a bicycle having the mechanism constructed in accordance with the invention applied thereto.
Figure 6:
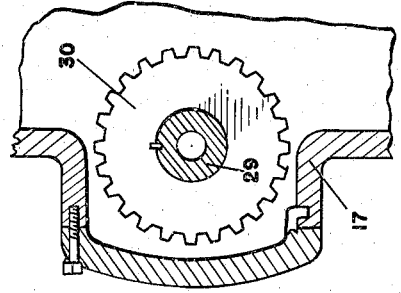
Figure 6 is a sectional view taken on the line 6—6 of Figure 1 looking in the direction of the arrows.

Referring to the drawings in detail, A designates generally a bicycle having a tubular body frame, only a portion thereof being denoted at 10, which in the rear fork 11 thereof is the rear power wheel 12 having its center hub 13 at opposite ends formed with toothed gears 14, these being concealed in bearing housings 15 which support an axle 16 on which the hub rotates, and such bearing housings are formed with lateral outwardly projecting end heads 17 of tubular shaft casings 18, they together with the bearing housings 15 are integral with the body frame 10.

The shaft casings 18 forwardly converge at opposite sides of the frame 10, and the forward end heads 19 thereof are integral with a pedal crank housing 20, which is a part of the said frame, which is provided with a removable side plate 21 to give access thereto. The housing 20 is centrally fitted with the pedal crank 21' having the pedal arms 22, as usual. The crank 21' has fixed thereto a main power gear 23 having concentric thereto a toothed ring 35 provided with internal peripheral gear teeth 24 and beveled side teeth 25, respectively. The gear 23 and ring 35 are confined within the housing 20 with cooperating anti-friction bearings 26 for the crank shaft 21'. Arranged concentric to the main power gear 23 are idle pinions 37 meshing with the teeth 24, and gear 23, respectively, while the side teeth 25 of this ring 35 mesh with bevel driven pinions 28 fitted to the forward ends of driven shafts 29 within the shaft casings 18, while at the rear ends of these shafts 29 are beveled pinions 30 meshing with the gears 14, the fore and aft ends of the said shafts 29 being confronted with caps 31 and 32, respectively, which are removable, and the caps 31 are susceptible of adjustment for taking up end thrust of the shafts 29.

The pinions 37 have their center axles fitted in bearings 33 formed internally of the housing 20, the crank shaft arms 22 being equipped with foot pedals 34, for the foot pedaling of the bicycle in the ordinary well known manner.

The movable parts of the mechanism are equipped with suitable anti-friction bearings where required, and these may be lubricated in any selected manner.

The bicycle A is manually pedaled and the rear wheel 12 is driven or powered by the gear mechanism as hereinbefore described.

The hub 13 of the wheel 12 is of sectional form with a clutch-like interfitting connection 36 therebetween, as best seen in Figure 2 of the drawings.

The ring 35 is held aligned with the gears or pinions 37 by peripheral flanges 37' on the latter, these pinions 37 being of sectional make-up, as disclosed in Figure 7 of the drawings.

The gear drive mechanism renders the bicycle chainless, and assures more power and, provides even pull on both sides of the said bicycle, the mechanism being also adaptable for operating motor-cycles and exercising machines, and yields smooth and easy running power, thereby overcoming much of the fatigue caused by the strenuous task of operating such as the old side draft chain type bicycle, and affords safety to a rider of the latter.

The mechanism provides a higher rate of speed, and thus gaining the desired point of destination in less time, with less physical energy.

What is claimed is:

In combination with a drive mechanism for bicycle frame comprising a traction wheel, a hub on the traction wheel having gears at the opposite sides thereof, driven shafts extending along the opposite sides of the traction wheel and having pinions respectively meshing with gears on the hub and pinions on their opposite ends, pairs of caps for covering the ends of said driven shafts, one cap of each pair being adjustable so that end thrust of the driven shaft whose end it covers may be taken up and adjusted for a crank shaft journalled in the bicycle frame and having pedals thereon and a central gear on the crank shaft, of a plurality of idler gears journalled on the frame and adapted to be driven by the crank shaft gear, and a ring gear with internal teeth operatively connected to the idler gears to be driven thereby, said ring gear having gear teeth at the opposite side faces thereof, respectively meshing with the pinions of the drive shafts.

ROY A. WATSON.

REFERENCES CITED

The following references are of record in the file of this patent:

UNITED STATES PATENTS

| Number | Name | Date |
|---|---|---|
| 616,571 | Harden | Dec. 27, 1898 |
| 620,929 | Jocelyn | Mar. 14, 1899 |

FOREIGN PATENTS

| Number | Country | Date |
|---|---|---|
| 354,795 | France | Aug. 8, 1905 |